Aug. 9, 1955   B. F. GREGORY   2,715,032
COMBINATION WHEEL MOUNTING AND SPRING UNIT FOR VEHICLES
Filed Jan. 2, 1952   2 Sheets-Sheet 1

INVENTOR.
Benjamin F. Gregory
BY
ATTORNEY.

Aug. 9, 1955 B. F. GREGORY 2,715,032
COMBINATION WHEEL MOUNTING AND SPRING UNIT FOR VEHICLES
Filed Jan. 2, 1952 2 Sheets-Sheet 2
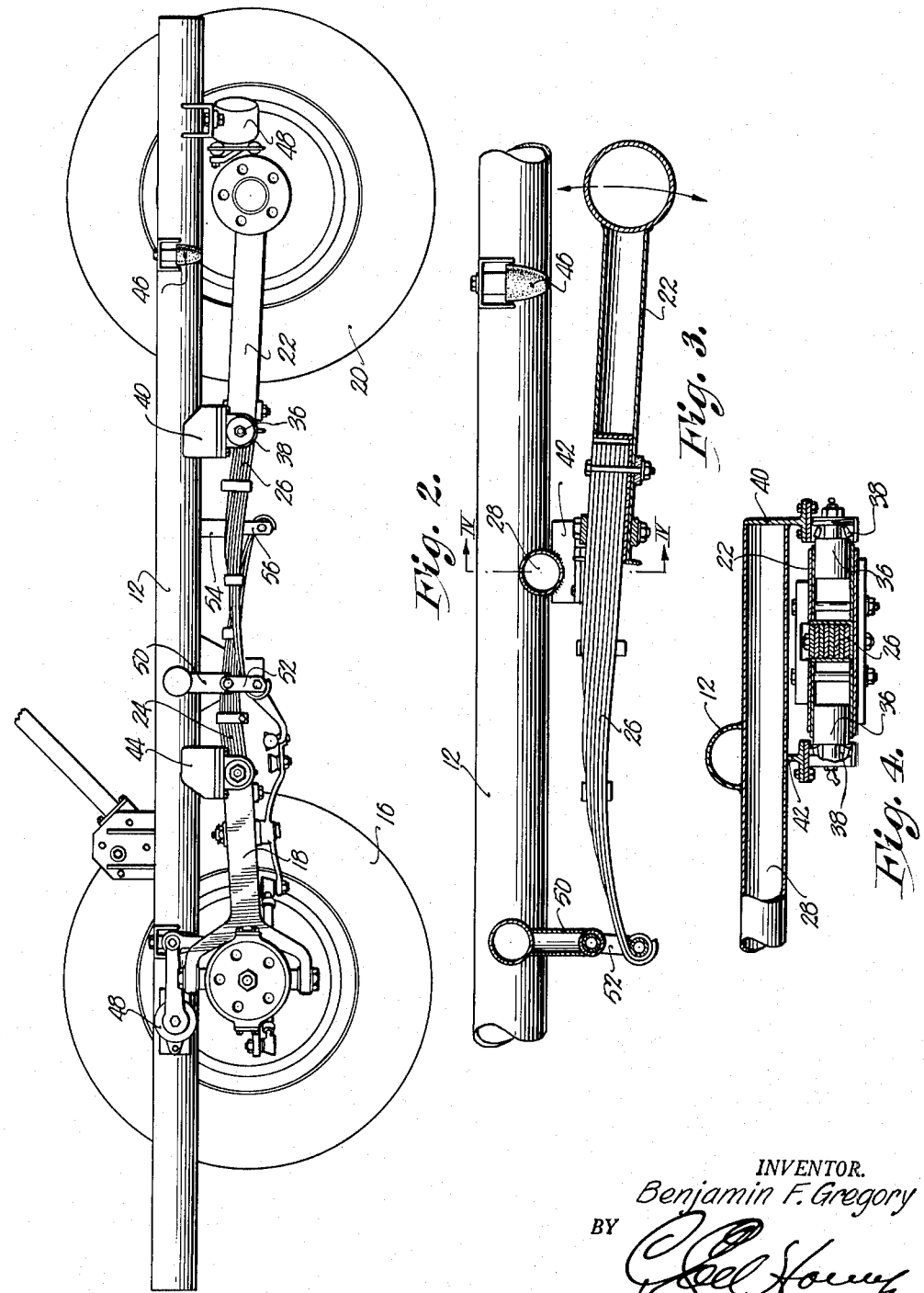
INVENTOR.
Benjamin F. Gregory
BY
ATTORNEY.

United States Patent Office 2,715,032
Patented Aug. 9, 1955

2,715,032

COMBINATION WHEEL MOUNTING AND SPRING UNIT FOR VEHICLES

Benjamin F. Gregory, Kansas City, Mo., assignor, by mesne assignments, to Marco Mfg. Company, Wheatland, Pa., a corporation Application January 2, 1952, Serial No. 264,571

1 Claim. (Cl. 280—106.5)

This invention relates to improvements in mobile vehicles particularly of the automotive type, the primary object being to provide a wheel mounting and spring assembly that is advantageous primarily from the standpoint of providing ease of riding, irrespective of unevenness of terrain over which the vehicle is advanced, and secondarily, though equally as important, to permit a relatively short wheel base, thereby reducing the over-all dimensions and providing a car that is particularly advantageous for use by the military services, though likewise of advantage in other commercial uses.

The military services particularly, are in need of a small wheeled vehicle that is highly maneuverable, capable of traversing the most hazardous terrain, safe from the standpoint of equilibrium, and sufficiently powerful to meet the extreme needs presented.

It is the most important object of the present invention therefore, to provide in a wheeled vehicle, individual mounting of the four wheels forming a part thereof, together with spring means for each wheel respectively, capable of permitting the car to climb relatively high ridges, pass through deep gullies, over rocks and other obstacles without appreciably affecting the driver or other occupants so far as ease of riding is concerned. Vehicles of this character have heretofore been provided and are presently in use by the armed services, but the same are in need of improvement in all of the above mentioned characteristics, the present invention having as its aim, the provision of a piece of military equipment that is capable of meeting all of the present day demands.

Another object hereof is to provide a mobile vehicle wherein the four wheels are each individually mounted for free swinging movement relative to the frame or chassis, limited only by the tension of springs associated therewith, by snubbers to retard the free swinging movement of the wheels relative to the frame, and by resilient bumpers within the path of travel of the arms provided to mount the wheels to the frame.

Other objects include the particular arrangement of the aforesaid parts which consists of extending swingable arms in opposite direction from pivot points on the frame, overlapping the longitudinally extending springs for each of the four wheels respectively, attaching one end of the springs to the swinging arms adjacent the point of swinging movement, pivotally connecting the springs at the opposite ends thereof to the frame, and utilizing a spring having a plurality of leaves, all for the purposes aforesaid and as will be made clear as the following specification progresses.

In the drawings:

Fig. 2 is a side elevational view thereof.

Fig. 3 is an enlarged, fragmentary, vertical, cross-sectional view taken on line III—III of Fig. 1, showing one of the rear arms and its spring; and Fig. 4 is a fragmentary cross-sectional view taken on line IV—IV of Fig. 3.

Figure 1:
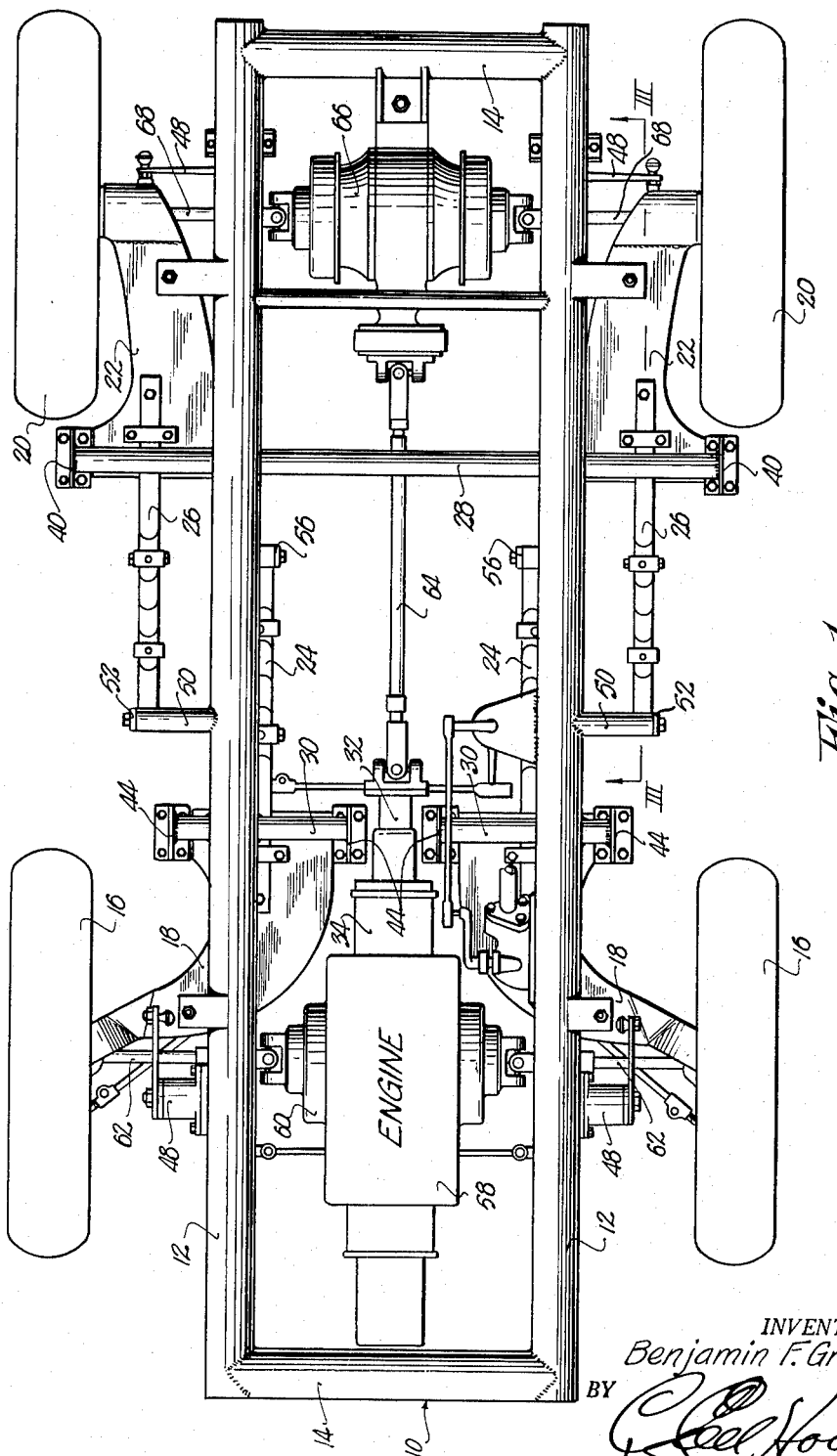
Figure 1 is a top plan view of a combination wheel mounting and spring unit for vehicles made pursuant to the present invention with the body of the vehicle entirely removed.

In the drawings there is shown a horizontal, rectangular, preferably tubular frame 10 having side beams 12 and end pieces 14, a pair of front wheels 16 being secured to beams 12 by arms 18, and a pair of rear wheels 20 having attachment to beams 12 through the medium of similar arms 22. Arms 18 are provided with springs 24 and arms 22, with springs 26, also attached to beams 12, each of the four springs consisting of a number of superimposed leaves, clamped together in any suitable manner as is clear from the drawings.

The arms 18 and 22 are swingably secured to beams 12 in similar fashion, there being a horizontal cross-member 28 common to the arms 22 and a pair of separate cross members 30, one for each arm 18 respectively. The cross-members 28 and 30 underlie the frame 10 in parallelism with end pieces 14, member 28 being attached to both beams 12, and members 30 being joined to a respective beam 12 and spaced to clear a portion 32 of transmission housing 34.

The arms 18 and 22 are tubular and each provided with a pair of opposed pintles 36, journalled in bearings 38. A pair of end plates 40 on member 28 and a pair of brackets 42 depending from member 28, each support one of the bearings 38. The members 30 each have a pair of end plates 44 for supporting a pair of similar bearings 38 for each arm 18 respectively. Thus, all of the arms 18—18 and 22—22, together with their wheels 16—16 and 20—20, are free to swing on horizontal axes against the tension of springs 24—24 and 26—26 respectively, limited only by bumpers 46 on beams 12 and by snubbers 48 joining the arms 18 and 22 with beams 12.

Springs 24 and 26 extend into their arms 18 and 22 to which they are clamped and are disposed with their longitudinal axes parallel with the beams 12. Lateral, L-shaped extensions 50 on beams 12, and links 52 depending from extensions 50, pivotally join the free ends of springs 26 to frame 10 and depending extensions 54 on beams 12, together with links 56 pivotally join the free ends of springs 24 to frame 10.

An engine 58 carried by frame 10, is operably connected with wheels 16 by differential 60 through shafts 62 and with wheels 20 through shaft 64, differential 66 and shafts 68.

It is now seen that the mounting for wheels 16 and 20 through the medium of arms 18 and 22 respectively, permits a very short wheel base without sacrifice of stability. As any one wheel 16 or 20 passes over an obstruction or falls into a cavity within the terrain traversed by the vehicle, such wheel is free to rise or fall as its arm swings on the horizontal axis 30—30 or 28 as the case may be. Such rising and falling of the wheels individually of the frame and of the remaining wheels, does not appreciably affect the attitude of the frame 10 since the latter remains substantially horizontal except in extreme cases where two or more wheels rise or fall simultaneously. By extending the springs from the arms in parallelism with the longitudinal axis of frame 10, and by mounting each spring directly to its arm at one end thereof and pivotally to the frame at the opposite end of the spring, these resilient elements become highly sensitive to vertical movement of the corresponding wheels.

Over ordinary terrain, the four wheels oscillate vertically in response to rises and falls in the terrain, and the shock is absorbed by the springs, as well as by the shock absorbers or snubbers, without appreciable effect upon the frame 10 on the body carried by the frame or the occupants of the vehicle.

It is extremely important to note that when the wheels 16 and 20 move vertically with respect to the frame 10, they travel in substantially a vertical plane by virtue of the horizontal axes 28 and 30 rather than tip toward and away from the beams 12 as in the case of many conventional mountings. This movement has the effect not only of improving the riding conditions of the vehicle, but lessens the wear on the tires and wheels themselves.

It is obvious that the provision of an arm for each wheel respectively, together with a spring on each arm, the overall length as well as the width of the wheel base, may be varied to suit the desires of the manufacturer and to accommodate various types of engines, transmissions, differentials and the like.

It is to be noted in Fig. 1 of the drawings, that the arms 18 extend forwardly and the arms 22 rearwardly from a mid-point between ends 14 of frame 10. Conversely, the springs 26 for the rear arms 22, extend forwardly from the cross member 28 toward the cross members 30 and the springs 24 extend rearwardly from the cross members 30, i. e. from the arms 18 toward the cross-member 28 and the arms 22. Consequently, the four springs 24 and 26 are all substantially between the cross-members 28 and 30 and overlap substantially midway between the ends 14 of frame 10. Such overlapping may be increased or decreased as desired, since by positioning of the springs 26 outwardly with respect to beams 12 and springs 24 inwardly of such beams 12, the front springs 24 do not interfere with the rear springs 26.

The aforesaid advantages resulting from a wheel mounting and spring suspension for wheeled vehicles and many others, will result from the present invention and it is, therefore, desired to be limited only by the spirit thereof as defined by the appended claim.

Having thus described the invention what is claimed as new and desired to be secured by Letters Patent is:

In an automotive vehicle having a frame provided with a pair of longitudinal beams, a wheel mounting assembly including a rear cross member rigid to the beams and extending therebeyond; a front cross member rigid to each beam respectively and parallel with the rear member; an elongated wheel-receiving arm adjacent each end respectively of the rear member and extending erarwardly therefrom; a front wheel-receiving arm beneath each front member respectively and extending forwardly therefrom beneath the beams, the arms being provided with means pivotally mounting the same for swinging movement on the members about horizontal axes; a semi-elliptical, upwardly bowed leaf spring unit rigid to each arm respectively, the springs of the rear arms extending forwardly and the leaf springs of the front arm extending rearwardly in parallelism and overlapping relationship to the springs of the rear arms, the beams each being provided with an outwardly projecting extension having link means swingably mounted thereto below the extensions and pivotally receiving the forwardmost ends of the springs of the rear arms, the springs of the front arms each substantially underlying one of the beams and being provided with link means pivotally and swingably suspending the rearmost ends thereof from the beams.

References Cited in the file of this patent

UNITED STATES PATENTS

| | | |
|---|---|---|
| Re. 18,885 | Dubonnet | July 4, 1933 |
| 379,999 | Steele | Mar. 27, 1888 |
| 928,242 | Bollbach et al. | July 20, 1909 |
| 1,281,233 | Van Geert | Oct. 8, 1918 |
| 1,686,561 | Hyde | Oct. 9, 1928 |
| 1,915,649 | Devillers | June 27, 1933 |
| 2,166,368 | Perron | July 18, 1939 |